United States Patent
Sharma et al.

(10) Patent No.: US 12,373,259 B2
(45) Date of Patent: Jul. 29, 2025

(54) DYNAMICALLY ADJUSTING PERFORMANCE TUNING PARAMETERS IN A NETWORK SYSTEM

(71) Applicant: Juniper Networks, Inc., Sunnyvale, CA (US)

(72) Inventors: Shailender Sharma, Bangalore (IN); Yuvaraja Mariappan, San Jose, CA (US); Rakesh Kumar Reddy Varimalla, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 827 days.

(21) Appl. No.: 17/455,867

(22) Filed: Nov. 19, 2021

(65) Prior Publication Data
US 2023/0161631 A1    May 25, 2023

(51) Int. Cl.
*G06F 9/46* (2006.01)
*G06F 9/48* (2006.01)
*G06F 9/50* (2006.01)

(52) U.S. Cl.
CPC .......... *G06F 9/5044* (2013.01); *G06F 9/4856* (2013.01); *G06F 9/505* (2013.01); *G06F 9/5072* (2013.01); *G06F 2209/501* (2013.01); *G06F 2209/5011* (2013.01); *G06F 2209/503* (2013.01); *G06F 2209/505* (2013.01)

(58) Field of Classification Search
None
See application file for complete search history.

(56) References Cited

U.S. PATENT DOCUMENTS

| | | |
|---|---|---|
| 9,571,394 B1 | 2/2017 | Sivaramakrishnan et al. |
| 10,708,082 B1 * | 7/2020 | Bakiaraj ............... H04L 45/586 |

(Continued)

FOREIGN PATENT DOCUMENTS

| | | |
|---|---|---|
| CN | 111176804 A | 5/2020 |
| WO | 2013184846 A1 | 12/2013 |

OTHER PUBLICATIONS

Brownlow et al. "CPU Management—CPU Pinning and Isolation in Kubernetes Technology Guide", Intel Corporation—Technology Guide, Jan. 2021, 24 pp.

(Continued)

*Primary Examiner* — Bing Zhao
(74) *Attorney, Agent, or Firm* — Shumaker & Sieffert, P.A.

(57) ABSTRACT

A container-based orchestration system includes a master node and a plurality of worker nodes. The master node can receive, from each agent executing on a corresponding worker node, node characteristics associated with the worker node. The master node can determine, for each worker node, one or more parameters corresponding to the node characteristics associated with the corresponding worker node and a node profile of the worker node and provide the parameters to the agent executing on the corresponding worker node. The agent configures the worker node in accordance with the parameters. In response to receiving a request to deploy a pod to a worker node, the master node can select a worker node to receive the pod based on the node characteristics and the pod characteristics. The agent can configure the selected worker node to execute workloads of the pod in accordance with the one or more parameters.

20 Claims, 7 Drawing Sheets

(56) References Cited

U.S. PATENT DOCUMENTS

| | | |
|---|---|---|
| 10,728,145 B2 | 7/2020 | Rao et al. |
| 10,897,497 B2 | 1/2021 | Sabath et al. |
| 2017/0168715 A1 | 6/2017 | Eshwarappa et al. |
| 2018/0157536 A1 | 6/2018 | Jiang et al. |
| 2020/0073692 A1 | 3/2020 | Rao et al. |
| 2021/0014114 A1 | 1/2021 | Doshi et al. |
| 2021/0019194 A1 | 1/2021 | Bahl et al. |
| 2022/0329651 A1* | 10/2022 | Kim .................. H04L 67/1008 |

OTHER PUBLICATIONS

Krishnakumar, "Accelerated DPDK in containers for networking nodes", Aalto University School of Electrical Engineering, May 1, 2019, 65 pp.

Pemmaraju, "Five Technical Challenges to Optimize Kubernetes for 5G Deployments", Platform9 [online]. Retrieved from the Internet: ://platform9.com/blog/five-technical-challenges-to-optimize-kubernetes-for-5g-deployments/>, Jun. 9, 2021, 6 pp.

"The TuneD Project: Tuning Profile Delivery Mechanism for Linux", TuneD [online]. Retrieved from the Internet: <://tuned-project.org/> First Accessed on Aug. 3, 2021, 2 pp.

Extended Search Report from counterpart European Application No. 22164449.5 dated Sep. 7, 2022, 10 pp.

Response to Extended Search Report dated Sep. 7, 2022, from counterpart European Application No. 22164449.5, filed Nov. 21, 2023, 6 pp.

First Office Action and Search Report, and translation thereof, from counterpart Chinese Application No. 202210305398.4 dated May 1, 2025, 24 pp.

\* cited by examiner

```
apiVersion: v1
kind: Pod
metadata:
 name: dpdk-test-pod-1
 namespace: test-dpdk-pods
 annotations:
  k8s.v1.cni.cncf.io/networks: '[{"name":"acme-vn1","namespace":"acme-project",
      "cni-args":{"interface-type":"virtio"},
"ips":["172.16.10.11"],"mac":"de:ad:00:00:be:ef"}]'
spec:
 containers:
  - name: pktgen-test-pod
    image: svl-artifactory.frobozz.net/junos-docker-local/warthog/pktgen_lua:20210505
    env:
    - name: POD_UID
     valueFrom:
      fieldRef:
       fieldPath: metadata.uid
    securityContext:
     privileged: true
    resources:
     requests:
      memory: 100Mi
     limits:
      hugepages-2Mi: 2Gi
    volumeMounts:
    - name: shared-dir
     mountPath: /vhu
     subPathExpr: $(POD_UID)
    - mountPath: /dev/hugepages
     name: hugepage
 nodeSelector:
  node-role.kubernetes.io/master: ""
 volumes:
 - name: shared-dir
  hostPath:
   path: /var/run/vrouter/
 - name: hugepage
  emptyDir:
   medium: HugePages
 tolerations:
  - key: "key"
   operator: "Equal"
   value: "value"
   effect: "NoSchedule"
```

FIG. 7

DYNAMICALLY ADJUSTING PERFORMANCE TUNING PARAMETERS IN A NETWORK SYSTEM

TECHNICAL FIELD

This disclosure relates to computing systems, and more specifically to configuring parameters of network nodes in a network system.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore processor architectures with a large number of cores per physical central processing unit (CPU), virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operating system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). A network system that manages deployment and infrastructure for application execution may use pods as part of orchestration, e.g., for automating deployment, scaling, and operations of applications across clusters of hosts and providing computing infrastructure, which may include container-centric computing infrastructure. A network system may also use pods for network management, e.g., for creating virtual networks in the network infrastructure to enable packetized communication among applications running on virtual execution environments, such as containers or VMs, as well as among applications running on legacy (e.g., physical) environments.

SUMMARY

In general, the disclosure describes a performance controller for a container-based orchestration system that implements techniques that can determine performance parameters based on node configurations and can dynamically adjust the parameters as conditions and workloads in the network system change. In large scale deployment environments such as data centers, there can be multinode clusters where the nodes in the cluster may have different configurations and different available resources. Further, the nodes may be used by different applications having different runtime characteristics and requirements. For example, some applications may have large memory requirements while other applications require fast response time. Various parameters can affect the performance aspects of nodes and applications running on the nodes. The values of these parameters may be different depending on the resources (real and virtual) available on the node and workloads hosted by the node. The process of setting or adjusting parameters on a node to attempt to achieve a performance characteristic or for a particular type of workload, application, or environment can be referred to as "tuning" the node. Similarly, the parameters that may be adjusted to tune a node to achieve a performance characteristic or for a particular type of workload, application or environment may be referred to as "tuning parameters."

As an example, a node that provides virtual routing services may provide such services with a virtual router that runs as a user mode application in user space memory of the node, as a kernel mode vrouter that runs in kernel space memory, or a vrouter that is integrated with a smart network interface card (NIC). Nodes that host virtual routers that run in user memory space may have different tuning parameter values from nodes that host a kernel mode virtual router that executes in kernel memory space. In some cases, tuning a node for a particular performance characteristic may cause a decrease in another performance characteristic. For example, tuning a node for power savings may increase the performance of the node with respect to power usage, but may decrease the performance of the node with respect to CPU processing.

Existing systems do not provide the ability to dynamically and automatically reconfigure nodes or adjust tuning parameters to maximize performance for current workload conditions. If tuning is done at all, it is typically done manually (e.g., by an administrator) on a node by node basis, and once done, tuning parameters typically remain static and do not change. Because tuning the numerous nodes that may exist in a data center is tedious and error prone, often no tuning is done at all.

The disclosure describes techniques that dynamically and automatically reconfigure nodes and/or adjust parameters to improve or maximize performance for current workload conditions. A performance controller on a master node of a node cluster can communicate with performance agents on worker nodes of the cluster. The performance agent running on the nodes can both report current node configuration data to the performance controller and can receive node tuning parameters that may be based on the current node configuration and current workloads executing on the node.

The techniques disclosed herein may be included in a practical application that provides technical advantages over existing systems. For example, as noted above, existing systems do not dynamically and automatically reconfigure nodes or adjust tuning parameters to maximize performance for current workload conditions. A practical application of the techniques disclosed herein is a performance controller and performance agent that can set various parameters on a worker node to tune the worker node according to a node profile specifying desired characteristics for the worker node. A technical advantage of the techniques disclosed herein is that a system including a performance controller implementing the techniques can maximize node performance in a cluster using feedback received from performance agents executing on the worker nodes of the cluster. The performance controller can use the feedback received from a performance agent for a node to set values of various parameters to tune the node for maximum performance given the characteristics specified for by the node's assigned profile. The tuning parameter values can be provided to the performance agent by the performance controller, and the performance agent can enforce the tuning parameters for the node. Further, the tuning parameters may be adjusted over time as conditions within a node or cluster of nodes change. Thus, the techniques disclosed herein can be an improvement over existing systems by facilitating maximizing performance for clusters having large numbers of worker nodes.

In one example, a method includes receiving, by a master node of a cluster and from each agent executing on a corresponding worker node of a plurality of worker nodes of the cluster, a plurality of node characteristics associated with the corresponding worker node of the plurality of worker nodes, wherein the cluster is a container-based orchestration system cluster, and wherein the master node manages orchestration of workloads on the worker nodes of the cluster; for each worker node of the plurality of worker nodes, determining, by the master node, one or more parameters corresponding to the plurality of node characteristics associated with the corresponding worker node and a node profile of the corresponding worker node, and providing, by the master node to the corresponding agent executing on the worker node, the one or more parameters, wherein the corresponding agent configures the worker node in accordance with the one or more parameters; receiving, by the master node, a request to deploy a pod having one or more pod characteristics; selecting, by the master node and based on the plurality of node characteristics and the one or more pod characteristics, a selected worker node of the plurality of worker nodes on which to deploy the pod; and scheduling, by the master node, the pod on the selected worker node.

In another example, a worker node includes a plurality of processors; a memory coupled to the plurality of processors; an orchestration agent that deploys a pod to the worker node in response to instructions from a master node that orchestrates workloads on the worker node, the master node being in a same cluster of nodes as the worker node, wherein the cluster is a container-based orchestration system cluster; and a performance agent executable by the plurality of processors, the performance agent configured to: monitor resource usage on the worker node, report the resource usage to the master node, receive one or more parameters from the master node, receive an indication from the orchestration agent that the pod is deployed to the worker node, the worker node selected by the master node in accordance with the resource usage, and configure the worker node to execute workloads of the pod in accordance with the one or more parameters.

In another example, a container-based orchestration system includes a master node; and a plurality of worker nodes communicatively coupled to the master node, wherein the master node manages orchestration of workloads on each of the plurality of worker nodes, wherein the master node comprises memory storing instructions that, when executed by processing circuitry of the master node, causes the master node to: receive, from each agent executing on a corresponding worker node of the plurality of worker nodes of the cluster, a plurality of node characteristics associated with the corresponding worker node, for each worker node of the plurality of worker nodes, determine one or more parameters corresponding to the plurality of node characteristics associated with the corresponding worker node and a node profile of the corresponding worker node, and provide, to the corresponding agent executing on the worker node, the one or more parameters, wherein the corresponding agent configures the worker node in accordance with the one or more parameters; receive a request to deploy a pod having one or more pod characteristics, select a selected worker node of the plurality of worker nodes to receive the pod based on the plurality of node characteristics and the one or more pod characteristics, and schedule the pod on the selected worker node, and wherein the agent of the selected worker node is configured to: receive an indication that the pod is scheduled to the selected worker node, and configure the selected worker node to execute workloads of the pod in accordance with the one or more parameters.

The details of one or more examples are set forth in the accompanying drawings and the description below. Other features, objects, and advantages will be apparent from the description and drawings, and from the claims.

BRIEF DESCRIPTION OF THE DRAWINGS

FIG. 7 shows an example pod application specification

DETAILED DESCRIPTION

Figure 1:
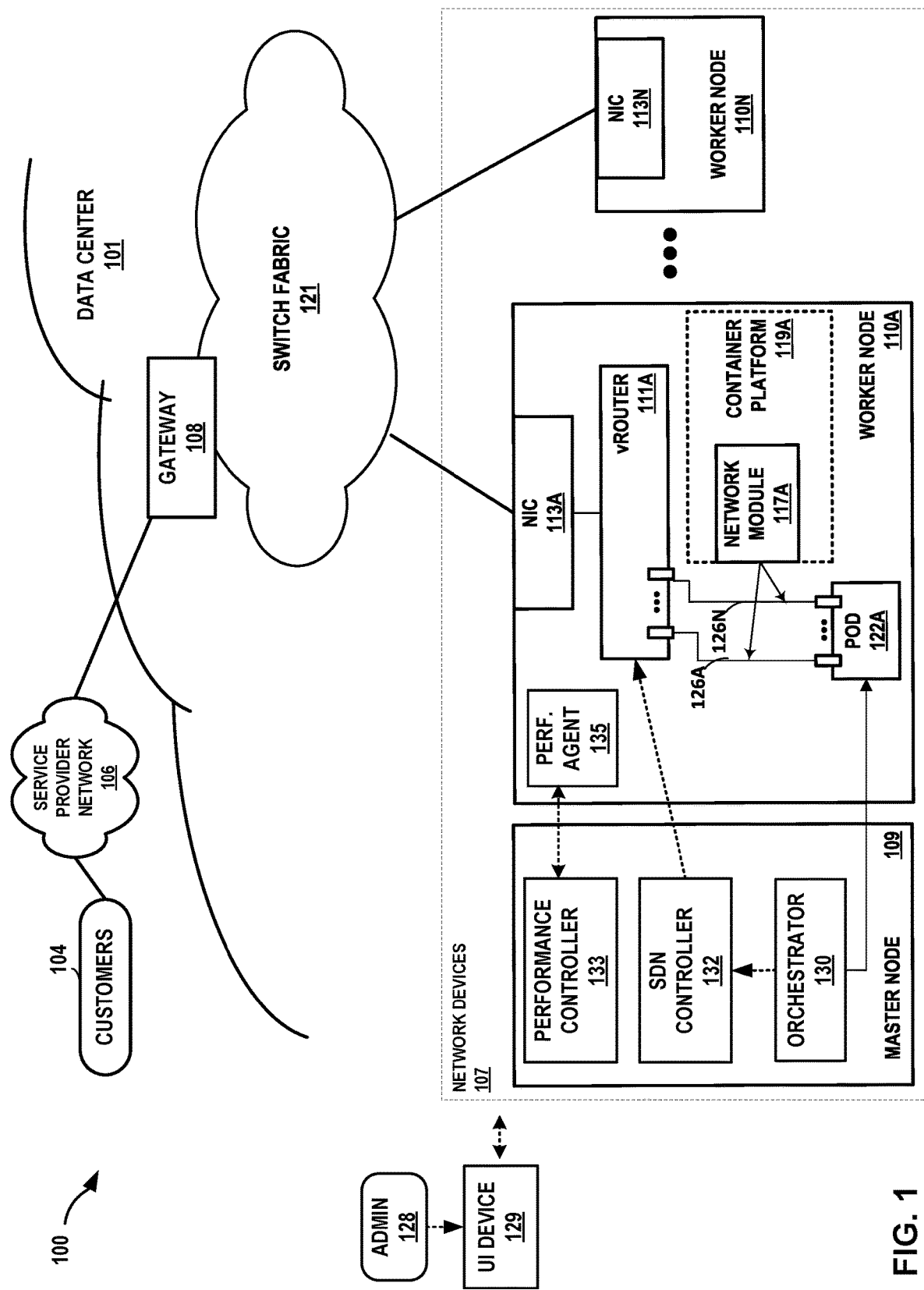
FIG. 1 is a block diagram illustrating an example network in accordance with one or more aspects of the present disclosure.

FIG. 1 is a conceptual diagram illustrating an example network that includes a performance controller for tuning performance parameters of nodes in the network. FIG. 1 illustrates one example implementation of a network system 100 and a data center 101 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks, and the like. Other implementations of network system 100 and data center 101 may be appropriate in other instances. Such implementations may include a subset of the components included in the example of FIG. 1 and/or may include additional components not shown in FIG. 1.

In the example of FIG. 1, data center 101 provides an operating environment for applications and services for customers 104 coupled to data center 101 by service provider network 106. Although functions and operations described in connection with network system 100 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 101 may represent one of many geographically distributed network data centers. As illustrated in the example of FIG. 1, data center 101 is a facility that provides network services for customers 104. Customers 104 may be collective entities such as enterprises and governments or individuals. For example, a network data center may host web services for several enterprises and end users. Other example services may include data storage, virtual private networks, traffic engineering, file service, data mining, scientific- or super-computing, and so on. In some examples, data center 101 is an individual network server, a network peer, or otherwise.

In the example of FIG. 1, data center 101 includes a set of storage systems, application servers, compute nodes, or other devices, including network devices 107. Network devices 107 may include master node 109 and worker node 110A through worker node 110N (collectively "worker nodes 110," representing any number of worker nodes). Devices 107 may be interconnected via high-speed switch fabric 121 provided by one or more tiers of physical network switches and routers. In some examples, devices 107 may be included within fabric 121, but are shown separately for ease of illustration.

Network devices 107 may be any of a number of different types of network devices (core switches, spine network devices, leaf network devices, edge network devices, or other network devices), but in some examples, one or more devices 107 may serve as physical compute nodes or storage nodes of the data center. For example, one or more of devices 107 may provide an operating environment for execution of one or more customer-specific applications or services. Alternatively, or in addition, one or more of devices 107 may provide an operating environment for one or more virtual machines or other virtualized instances, such as containers. In some examples, one or more of devices 107 may be alternatively referred to as a host computing device or, more simply, as a host. A network device 107 may thereby execute one or more virtualized instances, such as virtual machines, containers, or other virtual execution environment for running one or more services, such as virtualized network functions (VNFs).

In general, each of network devices 107 may be any type of device that may operate on a network and which may generate data (e.g., connectivity data, flow data, sFlow data) accessible through telemetry or otherwise, which may include any type of computing device, sensor, camera, node, surveillance device, or other device. Further, some or all of network devices 107 may represent a component of another device, where such a component may generate data collectible through telemetry or otherwise. For example, some or all of network devices 107 may represent physical or virtual network devices, such as switches, routers, hubs, gateways, security devices such as firewalls, intrusion detection, and/or intrusion prevention devices.

Although not specifically shown, switch fabric 121 may include top-of-rack (TOR) switches coupled to a distribution layer of chassis switches, and data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to forward and receive packets between switch fabric 121 and service provider network 106.

Any network device of network devices 107 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 101. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a data center 101 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of switch fabric 121 and a virtual overlay network. The role of the physical underlay network is to provide an "IP fabric," which provides unicast Internet protocol (IP) connectivity from any physical device (server, storage device, router, or switch) to any other physical device. The underlay network may provide uniform low-latency, non-blocking, high-bandwidth connectivity from any point in the network to any other point in the network.

As described further below with respect to virtual router (vrouter) 111A, virtual routers running in the network devices 107 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. Virtual routers may also support segment routing-MPLS (SR-MPLS) and IPv6 underlays. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the network devices 107. (Gateway routers or switches that connect a virtual network to a physical network are an exception and may contain tenant MAC or IP addresses.)

"Container-based" or "operating system" virtualization refers to the virtualization of an operating system to run multiple isolated systems on a single machine (virtual or physical). Such isolated systems represent containers, such as those provided by Kubernetes Container Runtime Interface—Open Container Initiative (CRI-O), containerd, the open-source Docker Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine (e.g., one of network devices 107) as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks. In some examples, containers are managed by their host kernel to allow limitation and prioritization of resources (CPU, memory, block I/O, network, etc.) without the need for starting any virtual machines. In some examples, containers may be deployed according to Linux Containers (LXC), an operating-system-level virtualization method for running multiple isolated Linux systems (containers) on a control host using a single Linux kernel.

Network devices 107 host virtual network endpoints for one or more virtual networks that operate over the physical network represented in FIG. 1 by switch fabric 121. Although described primarily with respect to a data center-based switching network, other physical networks, such as service provider network 106, may underlay the one or more virtual networks.

In some examples network system 100 includes orchestrator 130, and SDN controller 132. Virtual execution elements may be deployed to a virtualization environment using a cluster-based framework in which a cluster master node (e.g., master node 109) of a cluster manages the deployment and operation of containers to one or more cluster worker nodes (e.g., worker nodes 110A-110N) of the cluster. The terms "master node" and "worker node" used herein encompass different orchestration platform terms for analogous devices that distinguish between primarily management elements of a cluster and primarily virtual execution element hosting devices of a cluster.

Orchestrator 130 and SDN controller 132 may execute on separate computing devices, or may execute on the same computing device. Each of orchestrator 130 and SDN controller 132 may be a distributed application that executes on one or more computing devices. Orchestrator 130 and SDN controller 132 may implement respective master nodes for one or more clusters each having one or more worker nodes 110 implemented by respective network devices 107. In general, SDN controller 132 controls the network configuration of the data center 101 fabric to, e.g., establish one or more virtual networks for packetized communications among virtual network endpoints. SDN controller 132 provides a logically and in some cases physically centralized controller for facilitating operation of one or more virtual networks within data center 101. In some examples, SDN controller 132 may operate in response to configuration input received from orchestrator 130 and/or an administrator/operator. Additional information regarding SDN controller 132 operating in conjunction with other devices of data center 101 or other software-defined network is found in International Application Number PCT/US2013/044378, filed Jun. 5, 2013, and entitled "PHYSICAL PATH DETERMINATION FOR VIRTUAL NETWORK PACKET FLOWS;" in U.S. Pat. No. 9,571,394, issued Feb. 14, 2017, and entitled "Tunneled Packet Aggregation for Virtual Networks;" and in U.S. Pat. No. 10,728,145, issued Jul. 28, 2020 and entitled "MULTIPLE VIRTUAL NETWORK INTERFACE SUPPORT FOR VIRTUAL EXECUTION ELEMENTS," each which is incorporated by reference as if fully set forth herein.

In general, orchestrator 130 controls the deployment, scaling, and operations of virtual execution elements across clusters of network devices 107 and providing computing infrastructure, which may include container-centric computing infrastructure. In some examples, orchestrator 130 manages functions of data center 101 such as compute, storage, networking, and application resources. For example, orchestrator 130 may create a virtual network for a tenant within data center 101 or across data centers. Orchestrator 130 may attach virtual machines (VMs) to a tenant's virtual network. Orchestrator 130 may connect a tenant's virtual network to an external network, e.g., the Internet or a VPN. Orchestrator 130 may implement a security policy across a group of VMs or to the boundary of a tenant's network. Orchestrator 130 may deploy a network service (e.g., a load balancer) in a tenant's virtual network. Orchestrator 130 and, in some cases, SDN controller 132 may implement respective cluster masters for one or more Kubernetes clusters. As an example, Kubernetes is a container management platform that provides portability across public and private clouds, each of which may provide virtualization infrastructure to the container management platform. Kubernetes is available from the Cloud Native Computing Foundation of San Francisco, Calif. Each of network devices 107 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, worker node 110A hosts one virtual network endpoint in the form of pod 122A having one or more containers. However, a worker node 110 may execute as many virtual execution elements as is practical given hardware resource limitations of the worker node 110. Each of the virtual network endpoints may use one or more virtual network interfaces to perform packet I/O or otherwise process a packet. For example, a virtual network endpoint may use one virtual hardware component (e.g., a VNF) enabled by NIC 113A to perform packet I/O and receive/send packets on one or more communication links with switch fabric 121. Other examples of virtual network interfaces are described below.

Worker nodes 110 each include at least one NIC 113, which each include at least one interface to exchange packets with switch fabric 121 over a communication link. For example, worker node 110A includes NIC 113A. Any of NICs 113 may provide one or more virtual hardware components such as a virtual router 111 for virtualized input/output (I/0). A virtual hardware component for I/O may be a virtualization of a physical NIC 113 (the "physical function"). For example, the physical function of the network interface card (or "network adapter") is virtualized to present one or more virtual network interfaces as "virtual functions" for use by respective endpoints executing on the network device 110. In this way, the virtual network endpoints may share the same physical hardware resources and the virtual functions are examples of virtual hardware components. Virtual hardware components associated with NIC 113A may be associated with a layer 2 destination address, which may be assigned by the NIC 113A or a software process responsible for configuring NIC 113A.

Virtual routers 111 terminate virtual network overlay tunnels and determine virtual networks for received packets based on tunnel encapsulation headers for the packets, and forward packets to the appropriate destination virtual network endpoints for the packets. For worker node 110A, for example, for each of the packets outbound from virtual network endpoints hosted by worker node 110A (e.g., pod 122A), the virtual router 111A attaches a tunnel encapsulation header indicating the virtual network for the packet to generate an encapsulated or "tunnel" packet, and virtual router 111A outputs the encapsulated packet via overlay tunnels for the virtual networks to a physical destination computing device, such as another one of network devices 107. As used herein, a virtual router 111 may execute the operations of a tunnel endpoint to encapsulate inner packets sourced by virtual network endpoints to generate tunnel packets and decapsulate tunnel packets to obtain inner packets for routing to other virtual network endpoints.

Network system 100 implements an automation platform for automating deployment, scaling, and operations of virtual execution elements across network devices 107 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

In one example, pod 122A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 122A is an example of a virtual execution element. Containers of a pod are co-located on a single server, co-scheduled, and run in a shared context. The shared context of a pod may be a set of Linux namespaces, cgroups, and other facets of isolation. Within the context of a pod, individual applications might have further sub-isolations applied. Pods such as pod 122A may represent various workloads that are performed by network system 100.

Worker node 110A includes a container platform 119A for running containerized applications, such as those of pod 122A. Container platform 119A receives requests from orchestrator 130 to obtain and host, in worker node 110A, containers. Container platform 119A obtains and executes the containers.

Container platform 119A includes a network module 117A that configures virtual network interfaces for virtual network endpoints. The container platform 119A uses network module 117A to manage networking for pods, including pod 122A. For example, the network module 117A creates virtual network interfaces to connect pods to virtual router 111A and enable containers of such pods to communicate, via the virtual network interfaces, to other virtual network endpoints over the virtual networks. Network module 117A may, for example, insert a virtual network interface for a virtual network into the network namespace for containers of in pod 122A and configure (or request to configure) the virtual network interface for the virtual network in virtual router 111A such that the virtual router 111A is configured to send packets received from the virtual network via the virtual network interface to containers of pod 122A and to send packets received via the virtual network interface from containers of pod 122A on the virtual network. Network module 117A may assign a network address (e.g., a virtual IP address for the virtual network) and may setup routes for the virtual network interface. In Kubernetes, by default all pods can communicate with all other pods without using network address translation (NAT).

As part of the process of creating pod 122A, orchestrator 130 sends a message to SDN controller 132 to request that SDN controller 132 create respective virtual network interfaces for the multiple virtual networks (indicated in the configuration data). Orchestrator 130 may store, send to, or otherwise notify SDN controller 132 of virtual network configuration objects for the multiple virtual networks specified for pod 122A. For example, orchestrator 130 may obtain a pod manifest that includes an annotation indicating an interface type for a virtual network for pod 122A and deploy pod 122A to a host computing device. In this example, orchestrator 130 may store pod configuration data (e.g., virtual network configuration objects for the multiple virtual networks specified for pod 122A) for pod 122A. The pod configuration data may include the interface type for the virtual network for the pod. The pod configuration data may determine the interface type specified in the request to configure pod 122A. SDN controller 132 may configure any virtual networks not already configured in the network system 100.

SDN controller 132 processes the pod creation request to generate interface configuration data for the multiple virtual network interfaces 126 for pod 122A for communicating via virtual networks. The interface configuration data may include a container or pod unique identifier and a list or other data structure specifying, for each of virtual network interface 126, network configuration data for configuring the virtual network interface. Network configuration data for a virtual network interface may include a network name, assigned virtual network address, MAC address, and/or domain name server values. The multiple virtual network interfaces 126 may correspond to multiple virtual networks.

Network configuration data for pod 122A may include data describing multiple different virtual network interfaces 126. For example, orchestrator 130 may obtain a pod manifest that includes an annotation indicating an interface type for a virtual network for pod 122A and deploy pod 122A to a host computing device. In this example, orchestrator 130 may store pod configuration data (e.g., the network configuration data for pod 122A for a virtual network interface 126A) for pod 122A. The pod configuration data may include the interface type for the virtual network for the pod. The pod configuration data may determine the interface type specified in the request to configure pod 122A.

Performance controller 133 of master node 107 may interact with performance agents 135 of worker nodes 110. Performance controller 133 and performance agents 135 may implement one or more of the techniques described herein to adjust or tune parameters by which worker nodes 110 operate so as to improve or maximize the performance of worker nodes 110 with respect to various goals (e.g., low latency, maximum throughput, power savings, etc.). For example, performance controller 133 and performance agents 135 may dynamically and automatically reconfigure worker nodes 110 and/or adjust parameters of worker nodes 110 to improve or maximize performance for current workload conditions. A performance agent 135 executing on a worker node 110 can both report current node configuration data to performance controller 133 and can receive node tuning parameters from performance controller 133 that may be based on the current node configuration and current workloads executing on the node. Further details of the operation of performance controller 133 and performance agent 135 are provided below with respect to FIG. 2.

Figure 2:
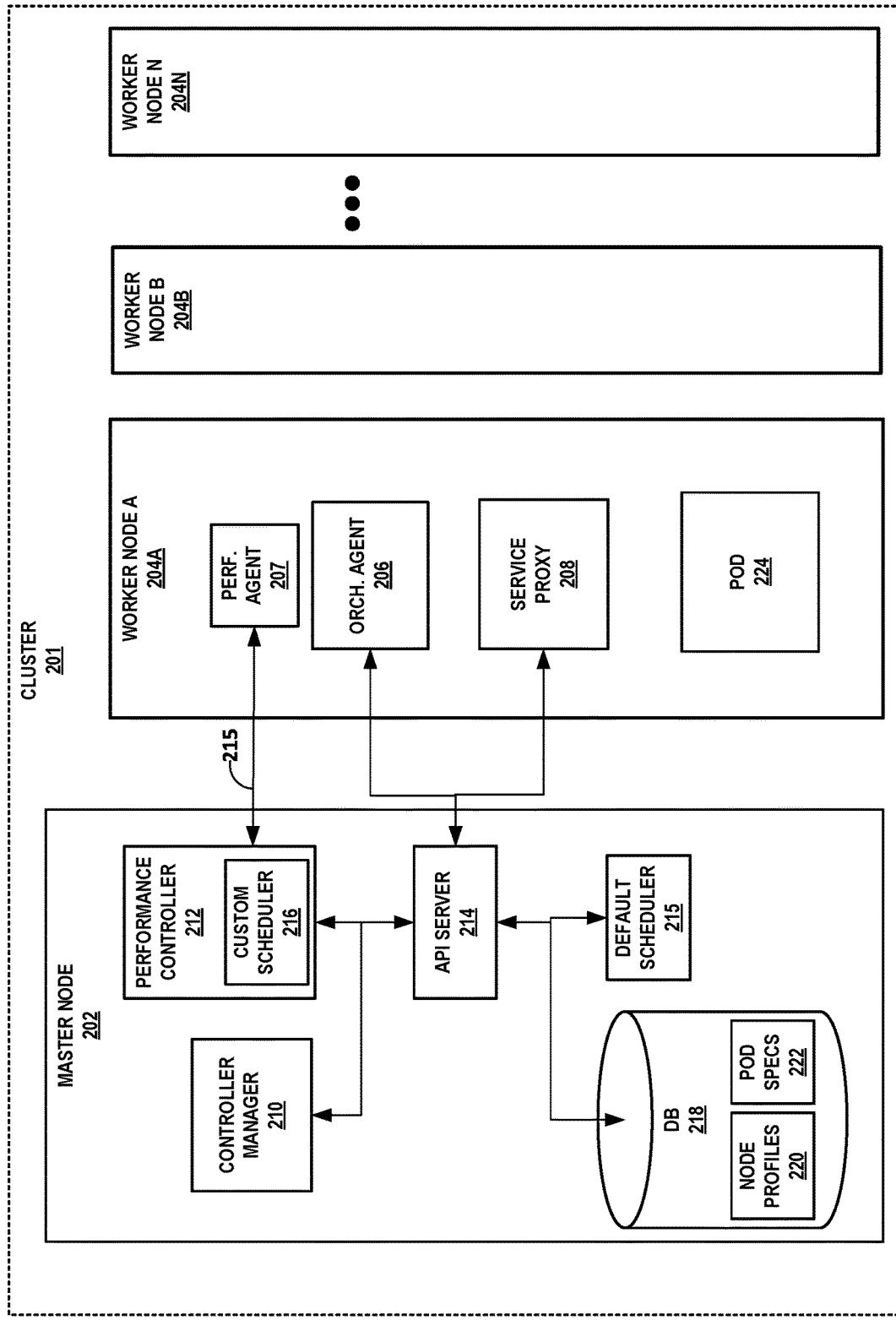
FIG. 2 is a block diagram illustrating aspects of a master node and worker nodes in a cluster of a network system in accordance with one or more aspects of the present disclosure.

FIG. 2 is a block diagram illustrating aspects of a master node and worker nodes in a cluster of a network system in accordance with one or more aspects of the present disclosure. In the example illustrated in FIG. 2, cluster 201 includes a master node 202 and worker nodes 204A-204N (referred to generically as a "worker node 204"). A worker node may also be referred to as a "compute node." Master node 202 may be an example implementation of master node 107 of FIG. 1, and worker nodes 204 may be example implementations of worker nodes 110 of FIG. 1.

In some aspects, master node 202 includes controller manager 210, performance controller 212, API server 214, default scheduler 215, custom scheduler 216, and database 218. Performance controller 212 may be an example implementation of performance controller 133 of FIG. 1. Master node 202 may manage worker nodes 204A-204N in cluster 201. In some aspects, master node 202 and worker nodes 204A-204N can be Kubernetes nodes.

Database 218 is a backing store for cluster data of cluster 101. Cluster data may include cluster state and configuration data. In some aspects, database 218 may be implemented as a key value store. Database 218 may be a central database or distributed database. In some aspects, database 218 can be a Kubernetes etcd database. Database 218 can store node profiles 220 and pod specifications 222. In some aspects, a node profile 220 can be a Kubernetes configmap. Node profile 220 can include parameters that describe one or more nodes of worker nodes 204A-204N. In some aspects, one or more of the parameters may be tuning parameters for a worker node. Examples of such parameters include Huge Pages, CPU Pinning, non-uniform memory access (NUMA) node binding, pod scheduling, CPU sharing restrictions, network interface card (NIC) configurations, CPU governors, operating system (OS) boot parameters, virtual router (vrouter) configurations, CPU yield parameters etc.

Huge Pages (also referred to as Super Pages or Large Pages) indicates that the worker node supports setting memory page sizes to a larger size than a default size (typically 4K bytes). Using a larger page size than the default page size can make memory management more efficient at the expense of potentially wasted memory.

CPU pinning determines how pods or applications are assigned to CPUs. An application or pod may be permanently assigned a fixed set of CPUs using CPU pinning. It can be advantageous to explicitly assign different processors to different components to competition for the same processor. For example, it can be advantageous from a performance perspective to pin a DPDK vrouter to processors that are different from the processors used by applications such as VNFs that use vrouter. In this example, the DPDK vrouter and processes using the DPDK vrouter will not have to compete for the same set of processors.

NUMA node binding specifies how pods are bound to NUMA nodes in a multiprocessor system. In NUMA implementations, each core in a multiprocessor system has access to local memory (e.g., memory on its NUMA node), and can also access the memory of other NUMA nodes. Access by a processor to memory on a NUMA node other than its own is comparatively slower than access to the local memory. In some aspects, performance can be increased by binding a pod application or other processes to the same NUMA node. For example, in the case of a DPDK vrouter, applications using the DPDK vrouter may execute faster if they are bound to the same NUMA node as the DPDK vrouter.

CPU sharing restrictions specify how the CPU is to be shared among pod applications, for example, how much shared CPU time is to be provided to a process.

Network interface card (NIC) configurations can indicate whether the NIC supports DPDK mode, frame sizes etc. For example, "Jumbo Frames" indicates that the NIC supports ethernet frames that are larger than 1500 bytes. Additionally, depending on the NIC type, certain tasks can be offloaded to the NIC from other processors. For example, a NIC may be able perform tasks such as generic receive offload (GRO), generic segmentation offload (GSO), hashing, calculating checksums, load balancing on multiqueues, etc. A vrouter can be tuned to use such NIC assisted offloading.

CPU governors can place limits on CPU frequency in order to achieve power savings goals.

Operating system (OS) boot parameters can include parameters to set up hugepages, enable/disable hyperthreading, CPU isolation parameters etc.

Virtual router configurations may indicate whether a virtual router is configured as a kernel mode virtual router or a data plane development kit (DPDK) virtual router.

CPU yield parameters can control the conditions under which a process will yield a CPU to other processes.

Different node profiles may have different parameter settings for the aforementioned parameters depending on whether the profile is for maximum packets per second (PPS), minimum latency, power savings, maximum throughput, or a balance of the aforementioned types. For example, a low latency profile may tune a node to disable hyperthreading, discover the physical NIC to NUMA bindings, perform CPU pinning based on configuration and CPU availability and information regarding physical NIC to NUMA bindings, configure vrouters to tune the queue/buffer sizes and burst processing for low latency, use large buffer sizes for throughput profile, and set CPU governor parameters for performance.

As another example, a powersave profile may cause a scheduler to avoid scheduling and running DPDK based application workloads on nodes having a powersave profile to avoid having the CPUS to be polled continuously. A CPU governor can be set to powersave, which can cause the CPUs to run at lower frequency, resulting in power savings.

A profile assigned to a node indicates that the node is to be tuned using the parameters indicated in the profile. For example, a node that is to provide maximum PPS may be assigned a PPS profile having parameters that are designed such that when applied to a worker node tune the worker node to provide maximum PPS. Similarly, a node that is to provide minimum latency may be assigned a minimum latency profile having parameters that are designed such that when applied to a worker node, tune the worker node for minimum latency. Node profiles may be combined or modified to create new profiles.

A cluster may include nodes having a mix of profiles and nodes can be categorized according to the profile. Workload scheduling (based on workload type DPDK or non-DPDK pod, etc.) can be tuned based on profile.

Pod specifications 222 describe aspects of pods that can be deployed to worker nodes 204A-204N. A pod specification may describe how the system is to run the containers in the pod. As an example, a pod specification may indicate that the pod is to be scheduled by customer scheduler 216. Pod specification 222 may indicate whether the pod applications should run on a node supporting Huge Pages. Pod specification 222 may indicate CPU pinning assignments for the applications in the POD. Further, a pod specification may indicate the type of vrouter that the pod applications are configured for, e.g., kernel mode or DPDK mode.

In some aspects, a pod can be matched to a worker node by detecting the pod type using an interface type custom field in "cni-args." For example, cni-args may indicate that the pod is a DPDK pod (virtio) or a non-DPDK pod (default veth). FIG. 7 shows an example DPDK pod specification in YAML Ain't Markup Language (YAML) that also specifies hugepages are to be available in the worker node.

API server 214 of master node 202 exposes an API for interaction with nodes of cluster 201. API server 214 can receive requests from end users, nodes 204, and external components. Such requests can include requests to deploy, delete, or move pods, query and change the state of objects within the system, requests for communication between objects, requests to add or delete resources etc. API server 214 validates and configures data for objects. API server 214 may implement a Representational State Transfer (REST) interface to process REST operations and provide the frontend to a corresponding cluster's shared state stored to database 218. API server 214 may authenticate and authorize requests. API server 214 communicates with other components of cluster 201 to instantiate virtual execution elements in the cluster. API server 214 may represent a Kubernetes API server.

Controller manager 210 manages controller processes of various components of the Kubernetes platform. A controller process is a process that monitors the state of nodes 204 in cluster 201. In some aspects, a controller process is a control loop that monitors a current state of cluster 201 by obtaining notifications from API server 214 and, if necessary, performs actions to change the current state of cluster 201 to a desired state. Various controller processes may exist and may monitor and/or control different aspects of cluster 201. Controller manager 210 may represent a Kubernetes Controller Manager for a Kubernetes cluster.

Performance controller 212 implements techniques described herein to tune node configuration parameters to maximize performance of a node according to the node's profile 220. For example, if a node has a profile indicating the node should be improved or optimized for maximum PPS, performance controller 212 can tune the configuration of the node to maximize PPS. Similarly, if a node has a profile indicating that the node should be improved or optimized for power savings, performance controller 212 can tune the configuration of the node for power savings. Further details on techniques used by performance controller 212 to tune the configuration of a node 204 are provided below.

Default scheduler 215 manages scheduling of pods such as pod 224 on nodes 204. As described above, a pod can include one or more containers, where each container is a self-contained application, including any libraries and configuration settings needed to run the application. Default scheduler 215 monitors for newly created or requested pods and can select one of nodes 204 to receive the pod and to run any of the applications in containers of the pod.

Custom scheduler 216 is a customized scheduler that runs in addition to, or instead of, default scheduler 215. A pod 224 can specify a scheduler that is to be used when scheduling the pod by adding an indicator identifying the desired scheduler to its associated pod specification 222. If a pod specification 222 does not specify a scheduler, default scheduler 215 can be used to schedule the pod on a worker node. If the pod specification 222 does specify custom scheduler 216, then custom scheduler 216 is responsible for scheduling the pod. Custom scheduler 216 can use the techniques described herein to select a worker node 204 for scheduling the pod based on characteristics of the pod and characteristics of available worker nodes. For example, if the pod specification for a pod specifies low latency characteristics for the container applications in the pod, custom scheduler 216 may select a worker node 204 that has been tuned for low latency (e.g., a worker node assigned a low latency profile). Similarly, if the pod specification for the pod specifies high throughput for the container applications in the pod, custom scheduler 216 may select a worker node 204 that has been tuned for high throughput (e.g., a worker node having a high throughput profile). Further details on this selection process are further described below. In some aspects, custom scheduler 216 may represent a Kubernetes custom scheduler.

Worker nodes 204 can host applications such as applications provided by one or more containers of pod 224. Custom scheduler 216 can schedule a pod having one or more containers on one or more of worker nodes 204. Worker nodes 204A-204N can include orchestration agents 206A-206N (referred to generically "orchestration agent 206") and service proxies 208A-208N (referred to generically as "service proxy 208") respectively. In implementations using Kubernetes, orchestration agent 206 may be a kubelet and service proxy 208 may be a kube-proxy.

Service proxy 208 is a network proxy that executes on worker nodes 204A-204N in. In some aspects, service proxy 208 provides services as defined in the Kubernetes API on each node and can perform TCP, UDP, and SCTP forwarding. Service proxy 208 monitors for the addition and removal of service and endpoints objects, and it maintains the network configuration of the worker node 204 to ensure communication among pods and containers, e.g., using services. Service proxy 208 may represent a kube-proxy for a worker node 204 of a Kubernetes cluster.

Orchestration agent 206 is an agent that runs on each of nodes 204 in cluster 201. Orchestration agent 206 monitors the state of containers that are running on its corresponding node. Orchestration agent 206 is an agent of an orchestrator, e.g., orchestrator 130 of FIG. 1, that receives container specification data for containers and ensures the containers execute by computing device 300. Container specification data may be in the form of a manifest file sent to orchestration agent 206 from orchestrator 130 or indirectly received via a command line interface, HTTP endpoint, or HTTP server. Container specification data may be a pod specification 222 (e.g., a PodSpec—a YAML (Yet Another Markup Language) or JSON object that describes a pod) for a pod, e.g., pod 224. Based on the pod specification, orchestration agent 206 obtains and instantiates the container images in pod 224 for execution on worker node 204.

Performance agent 207 provides node configuration information to performance controller 212 and receives parameter settings and actions from performance controller 212. Performance agent 207 and performance controller 212 communicate with one another via communications channel 215 to exchange information about worker node 204 and to tune performance of worker node 204. Communications channel 215, in some examples, can be implemented using Kubernetes APIs, Google remote procedure call (gRPC) etc. as shown in FIG. 2. In some aspects, performance agent 207 may be an independent module of worker node 204 as shown in FIG. 2. In some aspects, performance agent 207 may be a plug-in (e.g., a kubelet plug-in). In some aspects, performance agent 207 may be included in another agent or component of worker node 204, for example a vrouter agent (not shown in FIG. 2).

Performance agent 207 can perform both boot-time and run-time operations on a worker node 204. For example, when worker node 204 is initialized (e.g., upon boot or reboot of the worker node), performance agent 207 can communicate information about worker node 204 to performance controller 212. For example, performance agent 207 may collect information about NUMA configuration (if supported by the worker node), number of processors and types of processors, NIC type, memory configuration, disk partitions, power profile, virtual router mode (e.g., kernel mode or DPDK mode). Performance agent 207 can report the collected information to performance controller 212.

Performance controller 212 can use the information collected by performance agent 207 along with the worker node's assigned profile to configure the worker node. In some aspects, performance controller 212 can divide the CPUs reported by performance agent 207 into two pools of CPUs, a reserved pool and a non-reserved pool. In the case of CPUs in the reserved pool, the CPUs may be isolated or non-isolated based on profile parameters or virtual router mode. In some aspects, CPUs in the reserved pool will be reserved upfront for virtual routers, either DPDK virtual routers or kernel mode virtual routers. The CPUs reserved for virtual routers will not be used for pod workload scheduling. Additionally, a specific NUMA node may be reserved for vrouter applications based on a data path through the NIC. For example, a data path through the NIC may have management traffic. In this case, the NIC may be ignored by performance controller 212 for tuning purposes because performance tuning is not typically required for management traffic. In another case, a data path may have data plane traffic through a high performance NIC having offload capability. In this case, performance controller 212 may consider the NIC when tuning nodes for performance. CPUs may be reserved for kernel functionality. In some aspects, the "isolcpu" Linux kernel parameter may be used to isolate CPUs.

CPUs in the non-reserved pool are made available for pod workload scheduling. In some aspects, performance agent 207 can use the Linux "cpuset" configuration parameter to allocate CPUs to workloads. In some aspects, isolcpu may be used in addition to, or instead of, cpuset to assign workloads to CPUs. Workloads that do not need a dedicated CPU may be assigned a CPU from the non-reserved pool.

During the run-time of a worker node 204, performance agent 207 can monitor resource usage on its corresponding worker node 244 and enforce performance parameters. Performance agent 207 can provide feedback regarding resource usage of its corresponding worker node 244 to performance controller 212. Performance controller 212 and/or custom scheduler 216 can use this information to schedule pods on worker nodes. As an example, performance controller 212 can select a worker node whose profile matches characteristics provided in the pod specification, has enough available CPUs to support CPU pinning parameters in the pod specification (if any), and has available NUMA memory to support NUMA parameters provided in the pod specification (if any). Once assigned to a worker node, performance controller 207 of the worker node may assign the pod's workloads to CPUs and NUMA nodes. As an example, for latency and performance profiles, performance controller 207 may assign the pod's workloads to the same NUMA node and socket as a DPDK vrouter pod.

Performance agent 207 can enforce performance constraints on its corresponding worker node. For example, performance agent 207 can enforce CPU assignments of container applications in a pod. In Linux implementations, performance agent 207 may enforce CPU assignment and other resource assignments using "cgroups." Cgroups is a Linux kernel feature that manages the resource usage (e.g., CPU, memory, disk I/O, network, etc.) of a collection of processes. Performance agent 207 may use "isolcpu" (isolate CPU) for DPDK based worker nodes. Isolcpu removes the CPU from kernel scheduling. Performance agent 207 can then assign container applications to CPUs using processor affinity system calls. In the case of DPDK based worker nodes, performance agent 207 can assign DPDK based virtual routers to different CPUs from the VNFs that may use the virtual routers, thereby avoiding processor sharing (and potential CPU usage conflicts) between the VNFs and the vrouter used by the VNFs. Performance agent 207 can therefore assign and track what applications are using what CPUs. If performance agent 207 detects that a pod or application is not honoring (e.g., not complying with) the assignments specified by performance controller 212, performance agent 207 may send feedback to the performance controller. Performance controller 212 and/or custom scheduler 216 may attempt to resolve the conflicts by rescheduling the pod to a different worker node.

In some aspects, a user may reassign a different profile to a worker node 204 after an initial profile assignment. In such cases, workloads on the worker node 204 may be migrated to a different worker node having a matching profile for the workload. Once all workloads have been migrated off worker node 204, performance controller 212 can reconfigure worker node 204 using the new profile. For example, performance controller 212 may communicate new tuning parameters to performance agent 207 on worker node 204. Performance agent 207 can then set the received parameters on the worker node.

An example of the operation of cluster 201 will now be provided. A system administrator can assign profiles to worker nodes of cluster 201. For example, consider a 200 node cluster. The system administrator may assign a maximum PPS profile to 25 nodes as nodes, a minimum latency profile to 50 nodes, a maximum throughput profile to 75 nodes, and a power savings profile to 50 nodes. Additionally, in some aspects, nodes may be configured to run kernel mode virtual routers or DPDK mode virtual routers. In general, kernel mode virtual routers are implemented in the kernel of an operating system and thus run in kernel memory space. DPDK mode virtual routers run in the user memory space. As a result, DPDK mode virtual routers may have improved performance over kernel mode virtual routers because there are fewer context switches required when a DPDK mode vrouter sends or receives data to other user mode processes such as container applications on the worker node.

When worker nodes 204 are started, performance agent 207 may perform an introspection process of the node and report hardware and software configuration information to performance controller 212. For example, performance agent 207 may report number and type of CPUs, NIC type, memory configuration, disk partitions, power profile, NUMA configuration, support for jumbo frames, support for Huge Pages etc. Performance controller 212 can determine values for tuning parameters based on the feedback received from the worker node and parameters obtained from the profile assigned to the worker node. Performance controller 212 can send the tuning parameters to the worker node's performance agent 207. Performance agent 207 can configure the worker node based on the parameters. Additionally, in some aspects, performance agent 207 may tune the worker node configuration based on whether a vrouter for the worker node is a kernel mode vrouter or a DPDK vrouter.

Custom scheduler 216 may schedule pods by selecting a worker node of worker nodes 204A-204N to receive the pod. For pods having a pod specification that indicates custom scheduler 216 is to be used for scheduling, custom scheduler 216 may select a worker node based on matching the pod characteristics to the profiles and current resource usage of the worker nodes. In some aspects, custom scheduler 216 may perform a "best match" selection algorithm, e.g., custom scheduler 216 selects a worker node whose configuration and available resources are a best match to the pod specification. For example, a pod that specifies a low latency application may be assigned to a worker node having parameters tuned for low latency applications and that has available CPU, memory and other resources. Further, a pod may specify that it is configured to use a DPDK virtual router. In such cases, the scheduler will select a worker node that supports DPDK virtual routers.

If no best match criteria option is available, the pod may be scheduled based on maximum number of matches, for example, matches with CPU affinity, NUMA affinity, isolation, NIC, vrouter mode etc. A worker node with the highest number of matches may be chosen and custom scheduler 216 will schedule the pod accordingly.

Pods whose pod specification does not specify custom scheduler 216 may be scheduled by a default scheduler. For example, such pods may be scheduled by a standard Kubernetes scheduler.

As described above, performance agent 207 can provide dynamic feedback to performance controller 212 regarding the operation of its corresponding worker node 204. For example, performance agent 207 can monitor CPU, memory, disk usage and other resource utilization on the worker node and send such information to performance controller 212. Additionally, performance agent 207 can provide information on latency, throughput, interrupts etc. to performance controller 212. Performance controller 212 and/or custom scheduler 216 can use this information to schedule future deployments of pods to worker nodes 204.

In some aspects, data gathered from performance agents 207 may be made available via a dashboard to a user. The user may choose to do manual assignments of pods to some specific nodes bypassing the scheduler logic based on the data. Performance agent 207 can update the performance controller 212 in such cases so the controller can keep all resources/data up to date.

Figure 3:
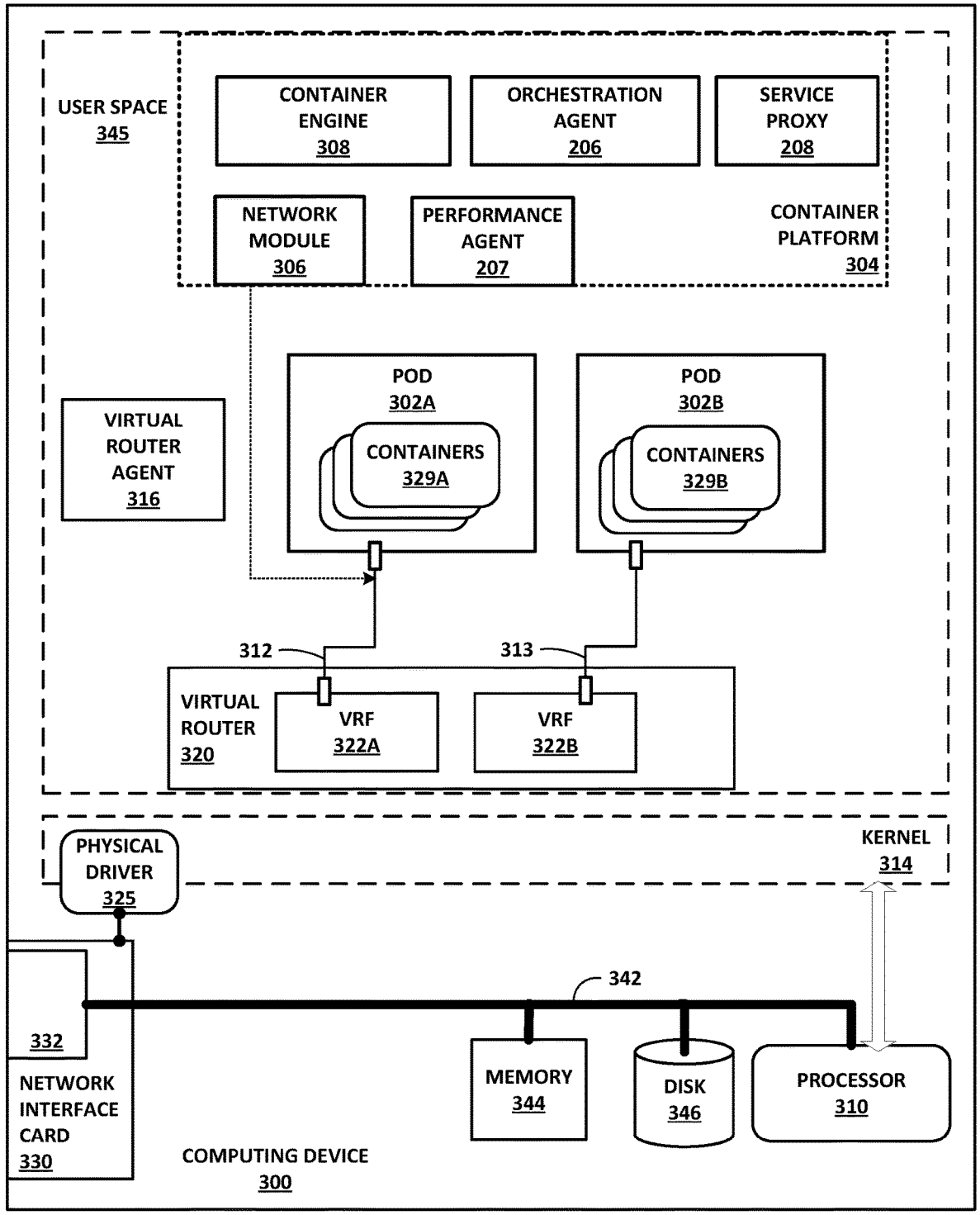
FIG. 3 is a block diagram of an example computing device that includes a performance agent for tuning performance parameters and configuration of the computing device, according to techniques described in this disclosure.

FIG. 3 is a block diagram of an example computing device (e.g., host) that includes a performance agent for tuning performance parameters and configuration of the computing device, according to techniques described in this disclosure. Computing device 300 of FIG. 3 may represent a real or virtual server and may represent an example instance of any of network devices 107 of FIG. 1, and master node 202 and worker nodes 204 of FIG. 2. Computing device 300 includes in this example, a bus 342 coupling hardware components of a computing device 300 hardware environment. Bus 342 couples network interface card (NIC) 330, storage disk 346, and one or more processors 310 (hereinafter, "processor 310"). NIC 330 may be DPDK-capable. A front-side bus may in some cases couple processor 310 and memory device 344. In some examples, bus 342 may couple memory device 344, processor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Processor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and processor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345.

Kernel 314 includes a physical driver 325 to use the network interface card 330. Network interface card 330 may be a physical network interface used by one or more virtual network interfaces to enable sharing the network interface card 330 among one or more virtual execution elements, such as containers 329A-229B or one or more virtual machines (not shown in FIG. 3). Shared virtual devices such as virtual functions may provide dedicated resources such that each of the virtual execution elements may access dedicated resources of NIC 330, which therefore appears to each of the virtual execution elements as a dedicated NIC.

Computing device 300 may be coupled (e.g., via NIC 330) to a physical network switch fabric that includes an overlay network that extends switch fabric from physical switches to software or "virtual" routers of physical servers coupled to the switch fabric, including virtual router 320. Virtual routers may be processes or threads, or a component thereof, executed by the physical servers, e.g., network devices 107 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of network devices 107. In the example computing device 300 of FIG. 3, virtual router 320 may execute within user space as a DPDK-based virtual router, but virtual router 320 may execute within a hypervisor, a host operating system, a host application, or a virtual machine in various implementations.

Virtual router 320 can be executed as a kernel module (e.g., a kernel mode virtual router) or as a user space DPDK process (e.g., a DPDK mode virtual router as shown here in user space 345). Virtual router agent 316 may also be executing in user space. In the example computing device 300 of FIG. 3, virtual router 320 executes within user space as a DPDK-based virtual router, but virtual router 320 may execute within a hypervisor, a host operating system, a host application, or a virtual machine in various implementations.

Virtual router agent 316 has a connection to SDN controller 132 (FIG. 1) using a channel, which is used to download configurations and forwarding information. Virtual router agent 316 programs this forwarding state to the virtual router data (or "forwarding") plane represented by virtual router 320. Virtual router 320 and virtual router agent 316 may be processes executed by processors 310.

In a kernel-based deployment of virtual router 320 (not shown), virtual router 320 is installed as a kernel module inside the operating system. Virtual router 320 registers itself with the TCP/IP stack to receive packets from any of the desired operating system interfaces that it wants to. The interfaces can be bond, physical, tap (for VMs), veth (for containers) etc. Virtual router 320 in this mode relies on the operating system to send and receive packets from different interfaces. Virtual router 320 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 320 (as shown in FIG. 3), virtual router 320 is installed as a user space 345 application that is linked to a DPDK library. This may lead to faster performance than a kernel-based deployment, particularly in the presence of high packet rates. The physical interfaces 332 are used by the poll mode drivers (PMDs) of DPDK rather the kernel's interrupt-based drivers. The registers of physical interfaces 332 may be exposed into user space 345 in order to be accessible to the PMDs; a physical interface 332 bound in this way is no longer managed by or visible to the host operating system, and the DPDK-based virtual router 320 manages the physical interface 332. This includes packet polling, packet processing, and packet forwarding. In other words, user packet processing steps are performed by the virtual router 320 DPDK data plane. The nature of this "polling mode" can make the virtual router 320 DPDK data plane packet processing/forwarding more efficient as compared to the interrupt mode of a kernel based virtual router when the packet rate is high. There are comparatively few interrupts and context switching during packet I/O, compared to kernel-mode virtual router 320, and interrupt and context switching during packet I/O may in some cases be avoided altogether.

Virtual router 320 may implement one or more virtual routing and forwarding instances (VRFs) 322A-222B for respective virtual networks for which virtual router 320 operates as respective tunnel endpoints. In general, each VRF 322 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 322 may include a network forwarding table storing routing and forwarding information for the virtual network.

Pods 302A-202B may represent example instances of pod 122A of FIG. 1 and/or pod 224 of FIG. 2. Pod 302A includes one or more containers 329A, and pod 302B includes one or more containers 329B.

Container platform 304 may represent an example instance of container platform 119A of FIG. 1, in further detail. Container platform 304 may include container engine 308, orchestration agent 206, service proxy 208, and network module 306. Network module 306 may represent an example instance of network module 117A of FIG. 1.

Orchestration agent 206 and service proxy 208 can include code executable as one or more processes by processor 310. Aspects of orchestration agent 206 and service proxy 208 have been described above with reference to FIG. 2.

Container engine 308 includes code executable by processor 310. Container engine 308 may be one or more computer processes. Container engine 308 runs containerized applications in the form of containers 329A-329B. Container engine 308 may represent a CRI-O, containerd Docker, rkt, or other container engine for managing containers. In general, container engine 308 receives requests and manages objects such as images, containers, networks, and volumes. An image is a template with instructions for creating a container. A container is an executable instance of an image. Based on directives from orchestration agent 206, container engine 308 may obtain images and instantiate them as executable containers 329A-329B in pods 302A-202B.

Orchestration agent 206 instantiates network module 306 to configure one or more virtual network interfaces for each of pods 302. For example, orchestration agent 206 receives a container specification data for pod 302A and directs container engine 308 to create the pod 302A with containers 329A based on the container specification data for pod 302A. Orchestration agent 206 also invokes the network module 306 to configure, for pod 302A, virtual network interface 312 for a virtual network corresponding to VRFs 322A. In this example, pod 302A and pod 302B are virtual network endpoints for the virtual networks corresponding to VRF 322A and VRF 322B. Any of virtual network interfaces 312, 313 may represent an example instance of one of virtual network interfaces 126 described in FIG. 1.

Network module 306 may obtain interface configuration data for configuring virtual network interfaces for pods 302. Virtual router agent 316 operates as a virtual network control plane module for enabling SDN controller 132 (FIG. 1) to configure virtual router 320. Unlike the orchestration control plane (including the container platforms 304 for worker nodes and the master node(s), e.g., orchestrator 130), which manages the provisioning, scheduling, and managing virtual execution elements, a virtual network control plane (including network controller 132, and virtual router agent 316 for worker nodes) manages the configuration of virtual networks implemented in the data plane in part by virtual routers 320 of the worker nodes. Virtual router agent 316 communicates, to network module 306, interface configuration data for virtual network interfaces to enable an orchestration control plane element (i.e., network module 306) to configure the virtual network interfaces according to the configuration state determined by the SDN controller 132, thus bridging the gap between the orchestration control plane and virtual network control plane. In addition, this may enable a network module 306 to obtain interface configuration data for multiple virtual network interfaces for a pod and configure the multiple virtual network interfaces, which may reduce communication and resource overhead inherent with invoking a separate network module 306 for configuring each virtual network interface.

Figure 4:
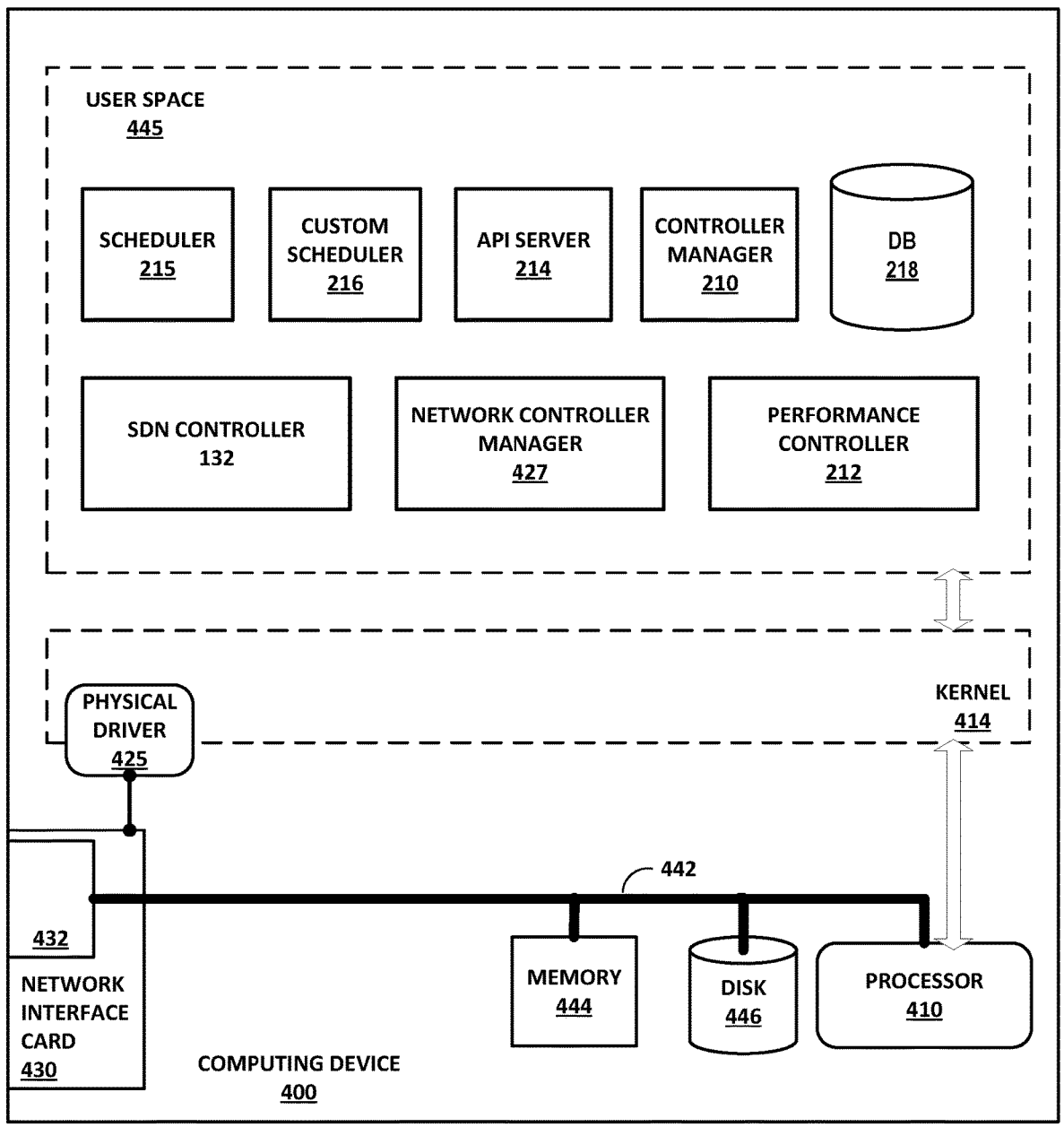
FIG. 4 is a block diagram of an example computing device operating that includes a performance controller for tuning performance parameters of worker nodes.

FIG. 4 is a block diagram of an example computing device operating that includes a performance controller for tuning performance parameters worker nodes. Computing device 400 of FIG. 4 may represent one or more of network devices 107 (FIG. 1) and master node 202 (FIG. 2).

Computing device 400 includes in this example, a bus 442 coupling hardware components of a computing device 400 hardware environment. Bus 442 couples network interface card (NIC) 430, storage disk 446, and one or more processors 410 (hereinafter, "processor 410"). A front-side bus may in some cases couple processor 410 and memory device 444. In some examples, bus 442 may couple memory device 444, processor 410, and NIC 430. Bus 442 may represent a Peripheral Component Interface (PCI) express (PCIe) bus. In some examples, a direct memory access (DMA) controller may control DMA transfers among components coupled to bus 442. In some examples, components coupled to bus 442 control DMA transfers among components coupled to bus 442.

Processor 410 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 446 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor 410.

Main memory 444 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 444 provides a physical address space composed of addressable memory locations.

Network interface card (NIC) 430 includes one or more interfaces 432 configured to exchange packets using links of an underlying physical network. Interfaces 432 may include a port interface card having one or more network ports. NIC 430 may also include an on-card memory to, e.g., store packet data. Direct memory access transfers between the NIC 430 and other devices coupled to bus 442 may read/write from/to the NIC memory.

Memory 444, NIC 430, storage disk 446, and processor 410 may provide an operating environment for a software stack that includes an operating system kernel 414 executing in kernel space. Kernel 414 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 414 provides an execution environment for one or more processes in user space 445. Kernel 414 includes a physical driver 425 that provides an interface for use by components of computing device 400 to use the network interface card 430.

Computing device 400 may be coupled to a physical network switch fabric (e.g., via NIC 430) that includes an overlay network that extends switch fabric from physical switches to software or "virtual" routers of physical servers coupled to the switch fabric, such virtual router 320 of FIG. 3. Computing device 400 may use one or more dedicated virtual networks to configure worker nodes 204 (FIG. 2) of a cluster.

Computing device 400 can include API server 214, default scheduler 215, custom scheduler 216 and controller manager 210 each include code executable as one or more computer processes by processor. Aspects of API server 214, default scheduler 215, custom scheduler 216, and controller manager 210 have been described above with reference to FIG. 2. In general, API server 214 may invoke default scheduler 215 or custom scheduler 216 to schedule a virtual execution element on a worker node 204 (FIG. 2). If the pod specification for the pod specifies that custom scheduler 216 is to be used to schedule the pod, custom scheduler 216 may select a worker node to schedule the virtual execution element according to the technique described herein. For example, custom scheduler 216 may select a worker node based on a best match between the node profile and tuning parameters with virtual element characteristics such as pod characteristics in a pod specification. API server 214 may invoke orchestration agent 206 (FIGS. 2 and 3) for the selected worker node, which may cause the container engine 308 (FIG. 3) for the selected worker node to obtain the virtual execution element from a storage server and create the virtual execution element on the worker node. The orchestration agent 206 for the selected worker node may update the status for the virtual execution element to the API server 214, which persists this new state to the database 218. In this way, computing device 400 instantiates new virtual execution elements in the computing infrastructure 8.

SDN controller 132 includes code executable by processor 410. SDN controller 132 may include one or more computer processes. SDN controller 132 may be a logically centralized but physically distributed controller that is responsible for providing the management, control, and analytics functions of a virtualized network. In particular, SDN controller 132 may be a logically centralized control plane and management plane of the computing infrastructure 8 and orchestrates virtual routers for one or more worker nodes.

SDN controller 132 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

SDN controller 132 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances.

SDN controller 132 programs network infrastructure elements to create virtual networks and may create interface configurations for virtual network interfaces for the virtual networks. Additional information regarding SDN controller 132 operating in conjunction with other devices of data center 101 or other software-defined network is found in International Application Number PCT/US2013/044378 and in U.S. patent appln. No. 14/226,509, incorporated by reference above.

Network controller manager 427 includes code executable by processor 410. Network controller manager 427 may be one or more computer processes. Network controller manager 427 operates as an interface between the orchestration-oriented elements (e.g., default scheduler 215, custom scheduler 216, API server 214, controller manager 426, and database 218) and SDN controller 132. In general, network controller manager 427 monitors the cluster for new objects (e.g., pods and services). Network controller manager 427 may isolate pods in virtual networks and connect pods with services. Network controller manager 427 may be executed as a container of the master node for a cluster.

Default scheduler 215, custom scheduler 216, API server 214, network controller manager 426, SDN controller 132, network controller manager 427, and database 218, although illustrated and described as being executed by a single computing device 400, may be distributed among multiple computing devices 400 that make up a computing system or hardware/server cluster. Each of the multiple computing devices 400, in other words, may provide a hardware operating environment for one or more instances of any one or more of default scheduler 215, custom scheduler 216, API server 214, network controller manager 426, SDN controller 132, network controller manager 427, or database 218. Default scheduler 215, Custom scheduler 216, API server 214, controller manager 210, and network controller manager 427 may implement an example instance of orchestrator 132. Network controller manager 427 may represent an example implementation of a Kubernetes cloud controller manager or Kube-manager.

Figure 5:
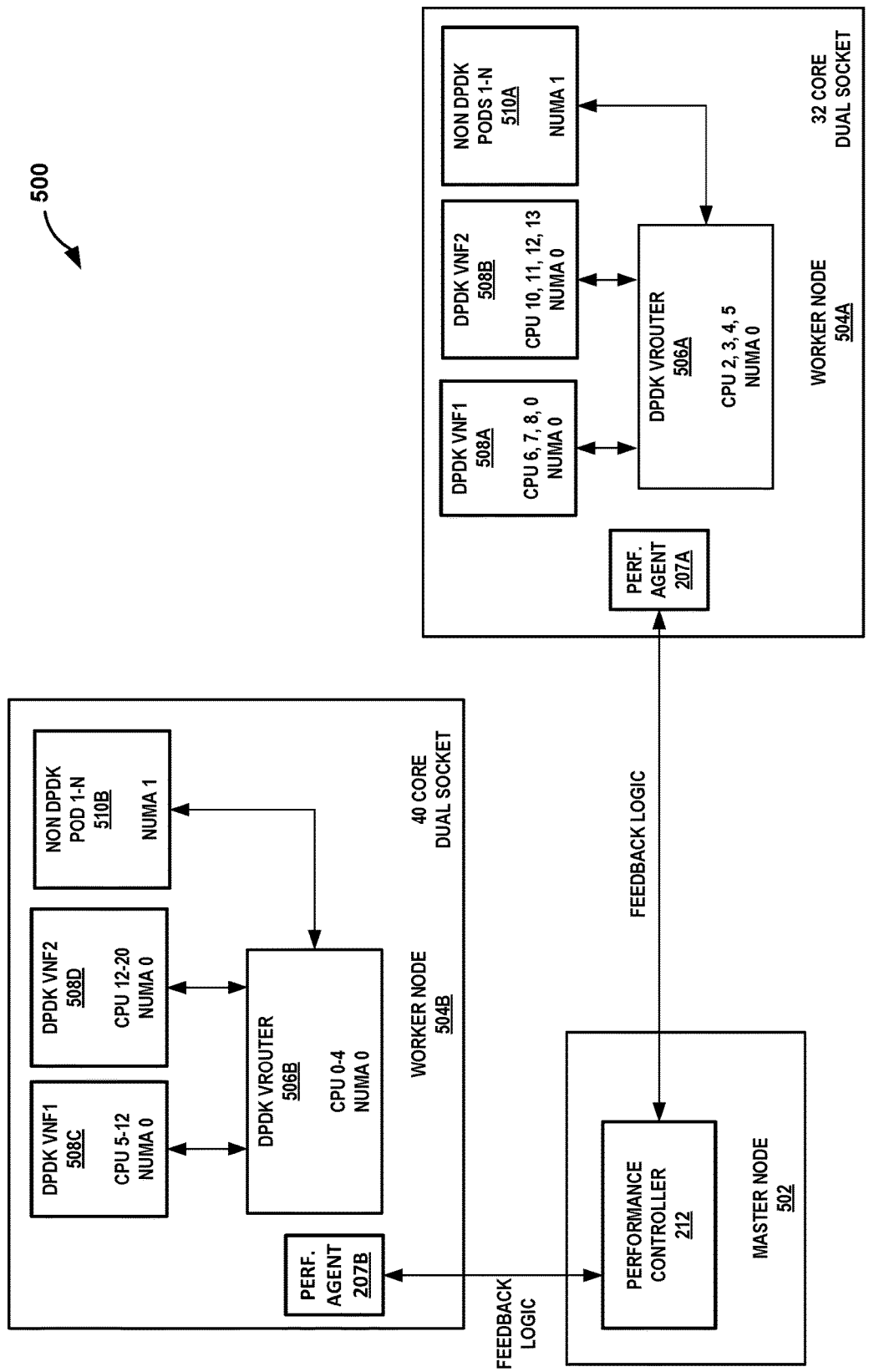
FIG. 5 is a block diagram illustrating an example cluster tuned according to the techniques described herein.

FIG. 5 is a block diagram illustrating an example cluster tuned according to the techniques described herein. In the example illustrated in FIG. 5, cluster 500 includes master node 502 running performance controller 212. Cluster 500 also includes worker nodes 504A and 504B, each with different hardware configurations. In this example, worker node 504A is a 32 core dual socket computing system and worker node 504B is a 40 core dual socket computing system. Each of worker nodes 504A and 504B has a respective performance agent 207A and 207B.

In this example, performance controller 212 schedules pods with a need for four cores and pods with a need for six cores on specific nodes, in order to achieve a desirable CPU utilization. Further, a CPU may be assigned to a POD such that the pod is allocated to the same NUMA node as a vrouter pod to achieve maximum performance. In the example illustrated in FIG. 5, VNFs 508A and 508B of worker node 504A are DPDK VNFs and have thus been assigned to the same NUMA node (e.g., NUMA 0) as vrouter 506A. Pods 1-N 510A are not configured for DPDK, and thus may be assigned to a different NUMA node (e.g., NUMA 1). Similarly, VNFs 508C and 508D utilize DPDK and have thus been assigned to NUMA 0, the same NUMA node as vrouter 506B. Pods 1-N 510B are not configured to use DPDK and are thus assigned to NUMA 1. Non DPDK application or kernel cores may be allocated from socket 2 and NUMA 2 and interrupts may be tuned to achieve best performance for such pods. As an example of interrupt tuning, performance controller 212 can disable irqbalance to avoid generic load balancing of interrupts. Performance controller 212 can also ban specific CPUs from irqbalance. As another example, performance controller 212 can load balance and/or map the interrupts onto specific queues used for packet processing in accordance with CPU affinity. For example, performance controller 212 can specify that interrupts on a NIC on CPU socket 0 only be handled by CPUs that are also on socket 0.

Figure 6:
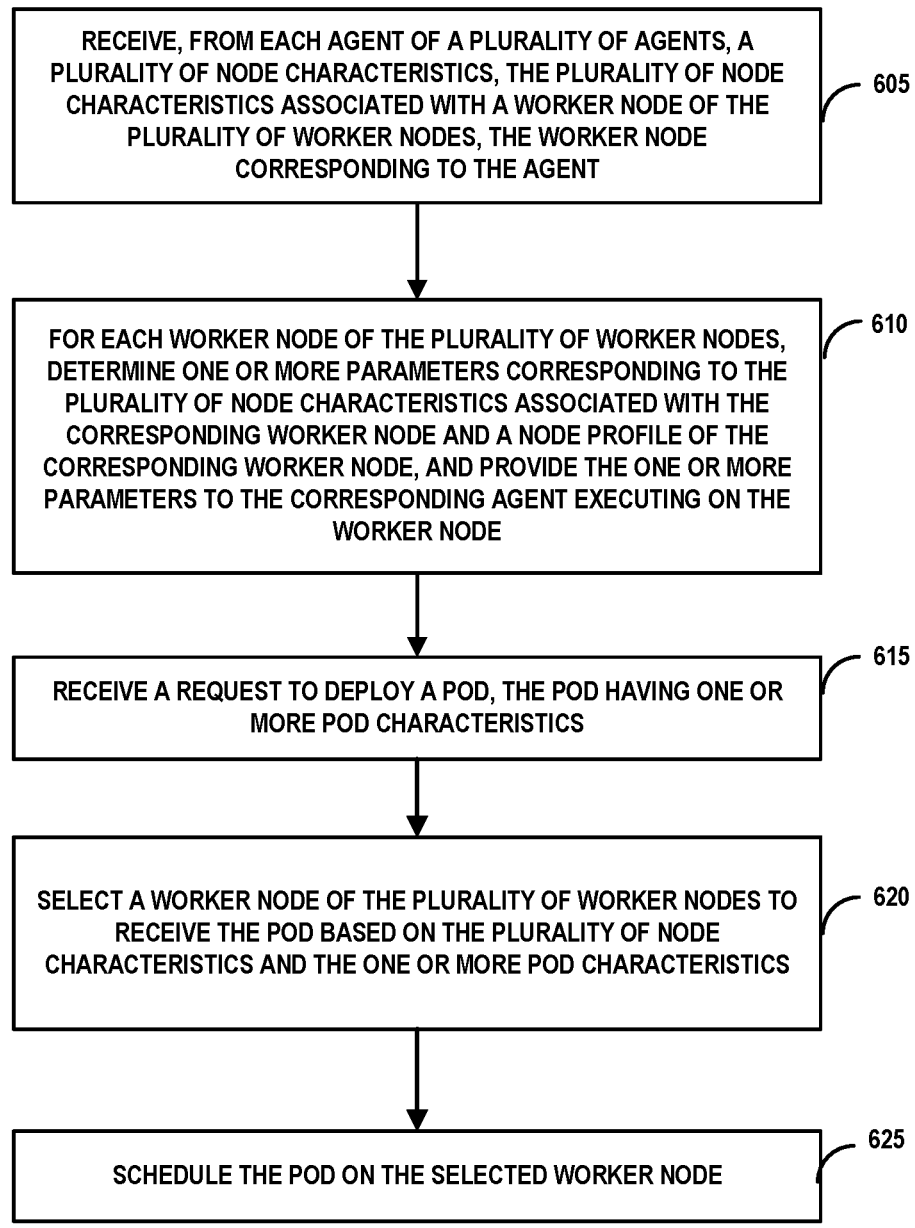
FIG. 6 is a flow diagram illustrating example operations in accordance with one or more techniques of this disclosure.

FIG. 6 is a flow diagram illustrating example operations in accordance with one or more techniques of this disclosure. A master node of a container-based orchestration system may receive, from each agent of a plurality of worker nodes of a cluster, a plurality of node characteristics, the plurality of node characteristics associated with a worker node corresponding to the agent (605). The master node may manage orchestration of workloads on the worker nodes of the cluster. Moreover, the master node may, for each worker node of the plurality of worker nodes, determine one or more parameters corresponding to the plurality of node characteristics associated with the corresponding worker node and a node profile of the corresponding worker node, and provide the one or more parameters to the corresponding agent executing on the worker node. (610). The corresponding agent configures the worker node in accordance with the one or more parameters. Next, the master node may receive a request to deploy a pod to a worker node, the pod having one or more pod characteristics (615). Next, the master node may select, a selected worker node of the plurality of worker nodes to receive the pod based on the plurality of node characteristics and the one or more pod characteristics (620). Next, the master node may schedule the pod on the selected worker node (625).

In some aspects, the techniques of this disclosure have been discussed in the context of an SDN. However, the techniques are not limited to SDNs, and can be implemented in many different environments that include a container-based orchestration system such as a Kubernetes platform.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1 and/or FIG. 3) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose processors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:

receiving, by a master node of a cluster and from each agent executing on a corresponding worker node of a plurality of worker nodes of the cluster, a plurality of node characteristics associated with the corresponding worker node, wherein the cluster is a container-based orchestration system cluster, and wherein the master node manages orchestration of workloads on the worker nodes of the cluster;

for each worker node of the plurality of worker nodes, determining, by the master node, one or more configuration parameters corresponding to the plurality of node characteristics associated with the corresponding worker node and a node profile of the corresponding worker node, and providing, by the master node to the corresponding agent executing on the worker node, the one or more configuration parameters, to enable the corresponding agent to configure the worker node in accordance with the one or more configuration parameters;

receiving, by the master node, a request to deploy a pod having a pod specification describing one or more pod characteristics;

subsequent to each of the plurality of worker nodes being configured by the corresponding agent in accordance with the configuration parameters, selecting, by the master node and based on the plurality of node characteristics and the one or more pod characteristics of the pod specification, a selected worker node of the plurality of worker nodes on which to deploy the pod; and scheduling, by the master node, the pod on the selected worker node.

2. The method of claim 1, wherein selecting the selected worker node comprises selecting the worker node based on that worker node being configured with a virtual router that is operating in a virtual router mode indicated by the one or more pod characteristics of the pod specification.

3. The method of claim 2, wherein the virtual router mode comprises a data plane development kit (DPDK) mode.

4. The method of claim 1, wherein the one or more configuration parameters include one or more of central processing unit (CPU) pinning parameters, non-uniform memory access (NUMA) binding parameters, and virtual router configuration parameters.

5. The method of claim 1, further comprising:
providing, by the master node to the corresponding agent of the selected worker node, one or more central processing unit (CPU) assignments for the pod, the CPU assignments based, at least in part, on one or more of the node characteristics of the selected worker node.

6. The method of claim 1, wherein selecting the selected worker node to receive the pod comprises selecting the selected worker node based on a best match between the plurality of node characteristics and the one or more pod characteristics of the pod specification.

7. The method of claim 1, further comprising:
receiving, by the master node and from the agent after initialization of the worker node, resource usage information associated with the worker node,
wherein selecting the selected worker node on which to deploy the pod is further based on the resource usage information.

8. The method of claim 7, further comprising:
determining, by the master node and based on the resource usage information, a number of currently available CPUs on the worker node; and
determining, based on the one or more pod characteristics of the pod specification, a number of desired CPUs for the pod,
wherein selecting the selected worker node on which to deploy the pod is further based on the currently available CPUs on the selected worker node and the desired number of CPUs for the pod.

9. The method of claim 8, further comprising:
determining, by the master node and based on the plurality of node characteristics, a first pool of reserved CPUs and a second pool of non-reserved CPUs,
wherein the currently available CPUs comprise available CPUs from the first pool of reserved CPUs.

10. The method of claim 1, wherein the node profile comprises a first node profile and wherein the worker node comprises a first worker node, wherein the method further comprises:

receiving, by the master node via a user interface device, an indication of a profile change for the worker node from the first node profile to a second node profile;

migrating, by the master node and based on receiving the indication of the profile change, workloads from the first worker node to a second worker node associated with the first node profile; and configuring, by the master node and subsequent to migrating the workloads, the first worker node in accordance with the second node profile.

11. A worker node comprising:
one or more processors;
memory coupled to the one or more processors;
an orchestration agent; and
a performance agent executable by the one or more processors, the performance agent configured to:
monitor resource usage on the worker node,
report the resource usage to a master node configured to orchestrate workloads on a plurality of worker nodes including the worker node, the master node being in a same cluster of nodes as the worker node, wherein the cluster is a container-based orchestration system cluster,
receive one or more configuration parameters from the master node, the one or more configuration parameters determined by the master node based on one or more node characteristics corresponding to the worker node of the plurality of worker nodes,
configure the worker node in accordance with the one or more configuration parameters from the master node,
subsequent to configuration of the worker node in accordance with the one or more configuration parameters, receive an indication from the orchestration agent that the worker node has been selected, by the master node based on the one or more configuration parameters and the resource usage, for deploying a pod having one or more pod characteristics defined by a pod specification, and
configure, based on the indication, the worker node to execute workloads of the pod such that the worker node executes the workloads of the pod in accordance with the one or more configuration parameters.

12. The worker node of claim 11, wherein the one or more processors comprises a plurality of processors, the worker node further comprising:
a virtual router configured to execute on a first subset of the plurality of processors;
wherein the performance agent is further configured to:
based on a determination that one or more configuration parameters indicate that the virtual router is configured as a data plane development kit (DPDK) virtual router, configure the workloads to execute on a same non-uniform memory access (NUMA) node of the worker node as the DPDK virtual router.

13. The worker node of claim 12, wherein the performance agent is further configured to execute the workloads on a second subset of the plurality of processors, wherein the first subset does not have any processors in common with the second subset.

14. The worker node of claim 11, wherein the performance agent is configured to, at an initialization time of the worker node, collect the one or more node characteristics of the worker node and provide the one or more node characteristics to the master node.

15. A container-based orchestration system comprising:
a master node; and
a plurality of worker nodes communicatively coupled to the master node, wherein the master node manages orchestration of workloads on each of the plurality of worker nodes,
wherein the master node comprises memory storing instructions that, when executed by processing circuitry of the master node, causes the master node to:
receive, from each agent executing on a corresponding worker node of the plurality of worker nodes, a plurality of node characteristics associated with the corresponding worker node,
for each worker node of the plurality of worker nodes, determine one or more configuration parameters corresponding to the plurality of node characteristics associated with the corresponding worker node and a node profile of the corresponding worker node, and provide, to the corresponding agent executing on the worker node, the one or more configuration parameters, to enable the corresponding agent to configure the worker node in accordance with the one or more configuration parameters;
receive a request to deploy a pod having a pod specification describing one or more pod characteristics,
subsequent to each of the plurality of worker nodes being configured by the corresponding agent in accordance with the configuration parameters, select a selected worker node of the plurality of worker nodes on which to deploy the pod based on the plurality of node characteristics and the one or more pod characteristics of the pod specification, and
schedule the pod on the selected worker node, and
wherein the agent of the selected worker node is configured to:
receive an indication that the pod is scheduled to the selected worker node, and
configure, based on the indication, the selected worker node to execute workloads of the pod such that the worker node executes the workloads of the pod in accordance with the one or more configuration parameters.

16. The container-based orchestration system of claim 15, wherein the selected worker node further comprises:
a virtual router,
wherein the agent of the selected worker node is further configured to:
based on to a determination that one or more configuration parameters indicate that the virtual router is configured as a data plane development kit (DPDK) virtual router, configure the workloads to execute on a same non-uniform memory access (NUMA) node of the selected worker node as the DPDK virtual router.

17. The container-based orchestration system of claim 16, wherein the virtual router executes on a first subset of a plurality of processors of the selected worker node, wherein the agent is further configured to execute the workloads on a second subset of the plurality of processors, wherein the first subset does not have any processors in common with the second subset.

18. The container-based orchestration system of claim 15,
wherein the agent is further configured to provide resource usage information associated with the selected worker node; and
wherein the master node selects the selected worker node on which to deploy the pod further based on the resource usage information.

19. The container-based orchestration system of claim 18, wherein the master node is further configured to:
determine, based on the resource usage information, a number of currently available CPUs on the selected worker node; and
determine, based on the one or more pod characteristics, a number of desired CPUs for the pod,
wherein the master node selects the selected worker node on which to deploy the pod further based on the currently available CPUs on the selected worker node and the desired number of CPUs for the pod.

20. The container-based orchestration system of claim 15, wherein the worker node comprises a first worker node and wherein the agent is further configured to:
based on a determination that a workload of the first worker node is not complying with a NUMA node assignment, report the non-compliance to the master node, wherein based on receiving the report of the non-compliance, the master node reschedules the pod having the workload to a second worker node having a same node profile as the first worker node.

* * * * *